(12) United States Patent
Fujimori et al.

(10) Patent No.: US 6,266,344 B1
(45) Date of Patent: Jul. 24, 2001

(54) DATA COMMUNICATION METHOD, ELECTRONIC APPARATUS, AND PHYSICAL-LAYER-CONTROL INTEGRATED CIRCUIT

(75) Inventors: Takahiro Fujimori, Tokyo; Tomoko Tanaka, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/943,611

(22) Filed: Oct. 3, 1997

(30) Foreign Application Priority Data

Oct. 3, 1996 (JP) .................................................. 8-281808

(51) Int. Cl.[7] .................................................. H04L 12/56
(52) U.S. Cl. .......................... 370/468; 370/423; 709/253; 710/107
(58) Field of Search .................................... 174/34; 348/8; 709/253, 227; 710/107, 160, 40; 370/256, 468, 465, 498, 423, 395; 340/825.17; 382/236

(56) References Cited

U.S. PATENT DOCUMENTS

| | | | |
|---|---|---|---|
| 5,485,488 | 1/1996 | Van Brunt et al. | 375/257 |
| 5,504,757 | 4/1996 | Cook et al. | 370/468 |
| 5,509,126 | 4/1996 | Oprescu et al. | 710/127 |
| 5,559,967 | 9/1996 | Oprescu et al. | 710/105 |
| 5,579,486 | * 11/1996 | Oprescu et al. | 710/107 |
| 5,687,319 | * 11/1997 | Cook et al. | 370/256 |
| 5,724,517 | * 3/1998 | Cook et al. | 709/227 |
| 5,784,648 | * 7/1998 | Duckwall | 710/40 |
| 5,787,259 | * 7/1998 | Haroun et al. | 709/253 |
| 5,808,660 | * 9/1998 | Sekine et al. | 348/8 |
| 5,854,591 | * 12/1998 | Atkinson | 340/825.17 |
| 5,945,631 | * 8/1999 | Hendrikson et al. | 174/34 |
| 5,991,520 | * 11/1999 | Smyers et al. | 710/100 |
| 6,014,381 | * 1/2000 | Troxel et al. | 370/395 |

FOREIGN PATENT DOCUMENTS 41 18 302  12/1991 (DE) .
0 658 010  6/1995 (EP) .
0 762 684  3/1997 (EP) .

OTHER PUBLICATIONS

J. R. Singh et al: "Optimal Synthesis of Robot Manipulators Based on Global Dynamic Parameters" International Journal of Robotics Research, vol. 11, No 6, Dec. 1992, pp. 538–548.

S. M. Megahed: "Efficient Computation Algorithm for Dynamic Modelling of Tree Structure Robot Arms" Robotics and Autonomous Systems, vol. 10, No. 4, Jan. 1992, pp. 225–242.

W. Schwinn: "Robopt—Ein System Zur Optimierung des Robotereinsatzes in Automatisierungsystemen Robopt—A System for Optimizing Robot Applications in Automation Systems" Automatisierungstechnik—AT, vol. 41, No.10, Oct. 1993, pp. 386–394.

"P1394 Link Layer Read Request Linked List Mechanism" IBM Technical Disclosure Bulletin, vol. 38, No. 3, Mar. 1, 1995, pp. 447–451, XP000508105.

Kunzman A J et al: "1394 High Performance Serial Bus: The Digital Interface for ATV" IEEE Transactions on Consumer Electronics, vol. 41, No. 3, Aug. 1995, pp. 893–900, XP000539552.

* cited by examiner

*Primary Examiner*—Hassan Kizou
*Assistant Examiner*—John Pezzlo
(74) *Attorney, Agent, or Firm*—Frommer Lawrence & Haug, LLP; William S. Frommer; Glenn F. Savit (57) ABSTRACT

In the 1394 communication, communication at a data rate of S100, S200, S400, S800, S1600, S3200 or at a faster speed in the future can be performed. When the 1394 communication is performed with an optical-fiber cable and a UTP cable, it is possible to cope with high-speed communication by arranging bits being not used at a low speed, on a data stream. Transmission of data rates is realized by sending speed-control symbols at a predetermined speed. As for a Tp bias signal, an equivalent object is achieved by sending predetermined control symbols.

10 Claims, 8 Drawing Sheets

SYMBOL USED (BIT)   SYMBOL BEING NOT USED (BIT)

FIG. 1C

SYMBOL USED (BIT)   SYMBOL BEING NOT USED (BIT)

| SYMBOLS | 5B | 4B |
|---|---|---|
| 0 | 1 1 1 1 0 | 0 0 0 0 |
| 1 | 0 1 0 0 1 | 0 0 0 1 |
| 2 | 1 0 1 0 0 | 0 0 1 0 |
| 3 | 1 0 1 0 1 | 0 0 1 1 |
| 4 | 0 1 0 1 0 | 0 1 0 0 |
| 5 | 0 1 0 1 1 | 0 1 0 1 |
| 6 | 0 1 1 1 0 | 0 1 1 0 |
| 7 | 0 1 1 1 1 | 0 1 1 1 |
| 8 | 1 0 0 1 0 | 1 0 0 0 |
| 9 | 1 0 0 1 1 | 1 0 0 1 |
| A | 1 0 1 1 0 | 1 0 1 0 |
| B | 1 0 1 1 1 | 1 0 1 1 |
| C | 1 1 0 1 0 | 1 1 0 0 |
| D | 1 1 0 1 1 | 1 1 0 1 |
| E | 1 1 1 0 0 | 1 1 1 0 |
| F | 1 1 1 0 1 | 1 1 1 1 |
| I (IDLE) | 1 1 1 1 1 | 1 0 1 0 |
| H (HALT) | 0 0 1 0 0 | 0 0 0 1 |
| JK (STARTING DELIMITER) | 1 1 0 0 0 AND 1 0 0 0 1 | 1 1 0 1 |
| T (ENDING DELIMITER) | 0 1 1 0 1 | 0 1 0 1 |
| R (RESET) | 0 0 1 1 1 | 0 1 1 0 |
| S (SET) | 1 1 0 0 1 | 0 1 1 1 |
| Q (QUIET) | 0 0 0 0 0 | 0 0 1 0 |
| V (VIOLATION) | 0 0 0 0 1 | 0 0 1 0 |
| V | 0 0 0 1 0 | 0 0 1 0 |
| V | 0 0 0 1 1 | 0 0 1 0 |
| L (EMBEDDED DELIMITER) | 0 0 1 0 1 | 0 0 1 0 |
| V | 0 0 1 1 0 | 0 0 1 0 |
| V | 0 1 0 0 0 | 0 0 1 0 |
| V | 0 1 1 0 0 | 0 0 1 0 |
| V | 1 0 0 0 0 | 0 0 1 0 |

IN CASE OF ON: ⎯⎯⎯ XXXXXXXXX..... ⎯⎯⎯   X : SYMBOL DIFFERENT FROM Q

IN CASE OF OFF: ⎯⎯⎯ QQQQQQQQQQ..... ⎯⎯⎯

DATA COMMUNICATION METHOD, ELECTRONIC APPARATUS, AND PHYSICAL-LAYER-CONTROL INTEGRATED CIRCUIT

BACKGROUND OF THE INVENTION

1. Field of the Invention

The present invention relates to a communication interface in which a data-transmission rate (hereinafter referred to as a "data rate") is variable and a cable to be used is defined as in a communication interface based on the IEEE 1394 standard, and in particular, to a technique for performing data communication with multi-purpose cables such as optical-fiber cables, UTP (unshielded twisted pair) cables and STP (shielded twisted pair) cables.

2. Description of the Related Art

A system in which electronic apparatuses such as a digital-video tape recorder, a digital television receiver, and a personal computer are connected by the IEEE 1394 (hereinafter referred to as the "1394") serial bus, and a digital-video signal, a digital-audio signal, a control signal and so forth are communicated among the electronic apparatuses is considered.

In the cable connecting the adjacent apparatuses in this system there are provided two pairs of twisted pair cables. One pair of cables is used to transmit data, while another pair of cables is used to transmit strobes. The data is coded by the DS (data strobe) coding method, and is transmitted.

In addition, a Tp bias signal is output to the one pair of twisted pair cables. When the Tp bias signal is detected by one apparatus connected by the 1394 cable, the apparatus having detected the bias signal become aware of its being connected to another apparatus, and resets the bus. When the bus has been reset, physical addresses are automatically assigned to the respective apparatuses. When a digital-video signal or the like is transmitted, transmission of the signal is started after performing acquisition of a necessary band and channel.

A signal for notifying another apparatus of one apparatus's data rate is transmitted to the other pair of twisted pair cables. The apparatuses directly connected by the twisted pair cables are capable of knowing each other's data rate.

As described above, conventionally, a cable defined by the 1394 (hereinafter referred to as a "1394 cable") is needed to realize communication via the 1394 serial bus (hereinafter referred to as the "1394 communication").

SUMMARY OF THE INVENTION

The present invention has been made in view of the problems, and an object thereof is to provide a data communication method, an electronic apparatus and an integrated circuit in which the multi-purpose usability of the 1394 interface can be expanded by using multi-purpose cables for use in a communication interface in which a data rate is variable and a cable to be used is defined as in the 1394 communication interface.

To this end, according to an aspect of the present invention, the foregoing object has been achieved through provision of a data communication method in which a plurality of electronic apparatuses provided with a communication interface based on the IEEE 1394 standard are connected by at least one type of cable among optical-fiber cables, unshielded-twisted pair (UTP) cables or shielded-twisted pair (STP) cables, and communication is performed among the electronic apparatuses.

The 1394 communication can perform communication at S100, S200, S400, S800, S1600 and S3200, and perform communication at a higher speed in the future. When the 1394 communication is performed with the optical-fiber cable, the UTP cable and the STP cable, bits being not used at a low data rate to transfer data in a data packet to be transmitted are arranged on a data stream so as to be adapted for high-speed communication.

Data-rate transfer realized with identical-phase signals in the conventional 1394 communication is realized by sending predetermined speed-control symbols when the optical-fiber cable, the UTP cable and the STP cable are used.

In the data communication method an effect equivalent to that of a bias signal, defined in the IEEE 1394 standard, to be supplied to the cables is realized by sending predetermined control symbols.

According to another aspect of the present invention, the foregoing object has been achieved through provision of an electronic apparatus provided with a terminal to which a cable defined in the IEEE 1394 standard is connected, and a terminal to which at least one type of cable among an optical-fiber cable, a UTP cable and an STP cable is connected.

According to a further aspect of the present invention, the foregoing object has been achieved through provision of a data communication method in which, when an interface adapted for a data-communication system having a variable data rate is used to perform data communication among a plurality of electronic apparatuses, a cable defined in the data-communication system is used, wherein, when a communication channel for performing the data communication using a multi-purpose cable different from the cable defined in the data-communication system is used, the data communication is performed using an arrangement of bits corresponding to the maximum data rate, and when the multi-purpose cable is used to perform the data communication at a low data rate, a bit region being not used to transfer data in a data packet to be transmitted is arranged on a data stream so as to be adapted for the plurality of data rates.

According to a still further aspect of the present invention, the foregoing object has been achieved through provision of an integrated circuit formed in a physical layer based on an interface adapted for a data-communication system whose data rate is variable, wherein the integrated circuit includes: a terminal to which a cable defined in the data-communication system is connected; and a terminal to which a multi-purpose cable different from the cable defined in the data-communication system is connected.

According to the present invention, the 1394 communication and so forth are realized by using an optical-fiber cable, a UTP cable and an STP cable. Thus, the multi-purpose usability of the 1394-communication interface and the like can be expanded.

DESCRIPTION OF THE PREFERRED EMBODIMENTS

Embodiments of the present invention will be described below with reference to the attached drawings.

In the 1394 communication there are defined communication data rates of S100 (98.304 Mbps), S200 (196.608 Mbps) and S400 (393.216 Mbps). At first, a method for coping with the three speeds with an optical fiber and a UTP will be described.

Figure 1A:
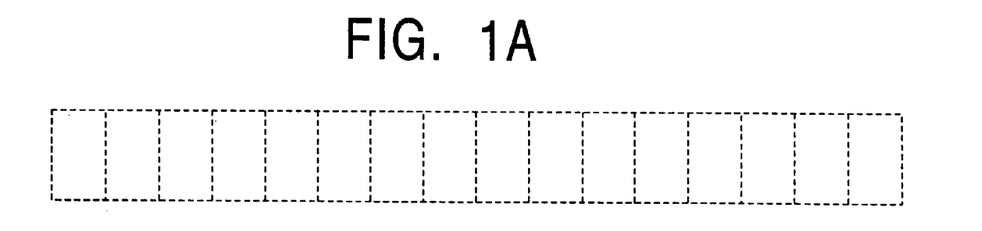
FIGS. 1A to 1D are charts showing examples of arrangements of symbols on data streams, according to the present invention.
Figure 1B:
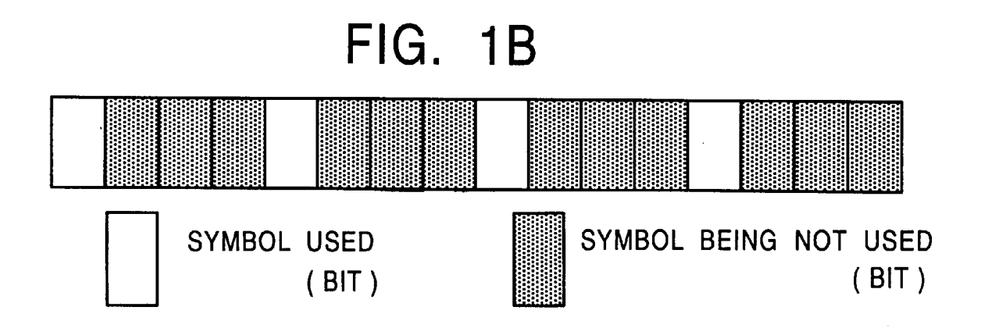
Figure 1C:
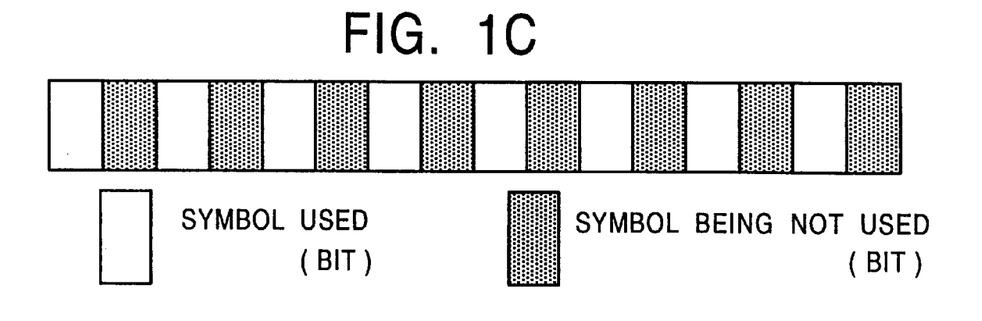
Figure 1D:
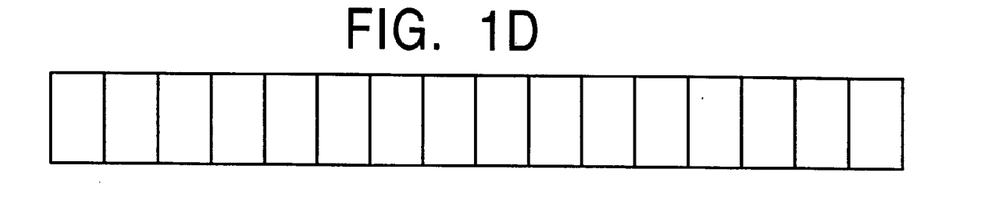

In FIGS. 1A to 1D are shown arrangements of symbols when a maximum data rate of S400 is used. FIG. 1A shows an arrangement of the symbols on a data stream. At a data rate of S100, only one symbol out of four symbols is used to perform communication as shown in FIG. 1B. Two symbols are used at S200 as shown in FIG. 1C, and all the symbols are used at S400 as shown in FIG. 1D. This manner enables communication at a quarter data rate and a half data rate. In addition, if communication at a speed equal to or more than S400 is newly defined in the future, the intervals of bits to be used are adjusted. In this case, nodes performing communication need to know each other's maximum data rate. Although the operating conditions of the symbols (in units of four bits) corresponding to the data rates are shown in FIGS. 1A to 1D, the symbols may be arranged in units of one bit, two bits, one byte (eight bits) or one word (sixteen bits).

Figure 3:
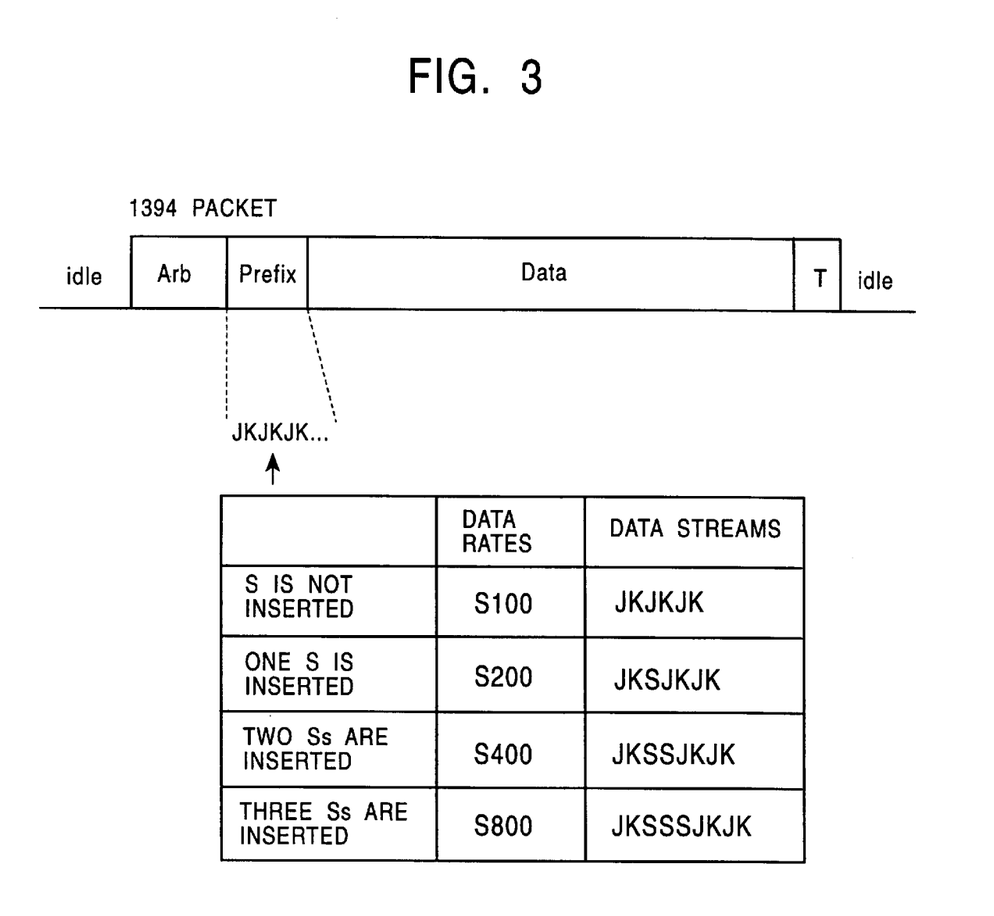
FIG. 3 is a chart showing an embodiment of a method for transmitting a data rate according to the present invention.

This method can be applied to the data area of a 1394 packet (being isochronous or asynchronous) shown in FIG. 3. In application, positions at which a transmitting end and a receiving end read symbols must be synchronized, which is executed by the following method. In other words, in the prefix area, control symbols "JK" are continuously transmitted. Both communication nodes must know that each node will start reading the symbols just after the continuous output of the symbols JK (or after the designated number of the symbols) is interrupted. The unique arrangement of the symbol "JK" is effective in symbol synchronization. Accordingly, in this embodiment, separation for each set of five bits is easily recognized by the symbol "JK". In FIG. 3 the Arb represents arbitration, and T represents a symbol "T" (end).

Figure 2A:
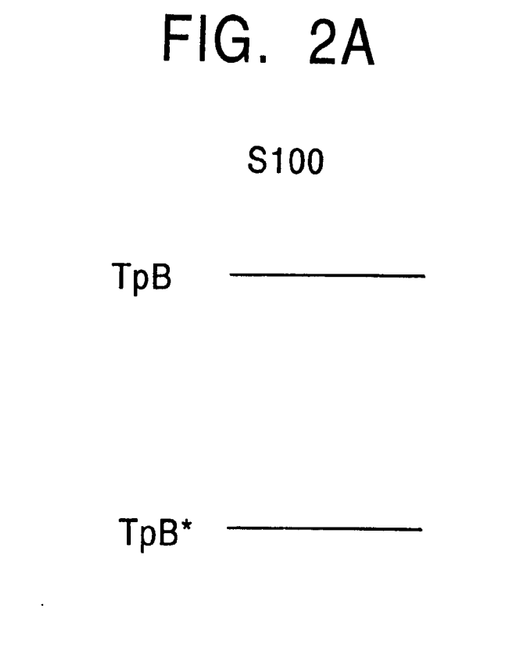
FIGS. 2A to 2C are charts showing a method for transmitting data rates when a 1394 cable is used.
Figure 2B:
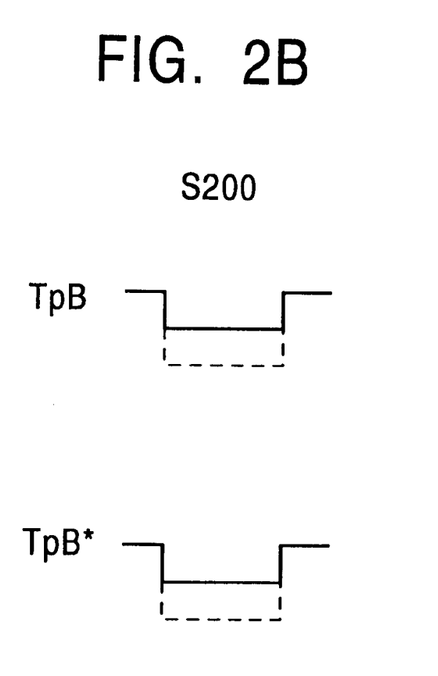
Figure 2C:
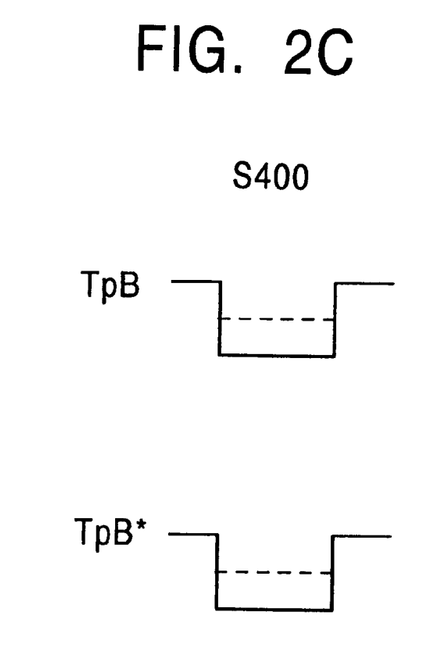

Next, a method for transmitting data rates in the 1394 communication will be described. As shown in FIGS. 2A to 2C, according to the 1394 standard, data rates of S100, S200 and S400 are transmitted by setting the levels of TpB and TpB*, as bias signals which flow in the cable for transmitting the strobe signal, to mutually different predetermined levels during e.g., 100 to 120 nanoseconds.

Figure 4:
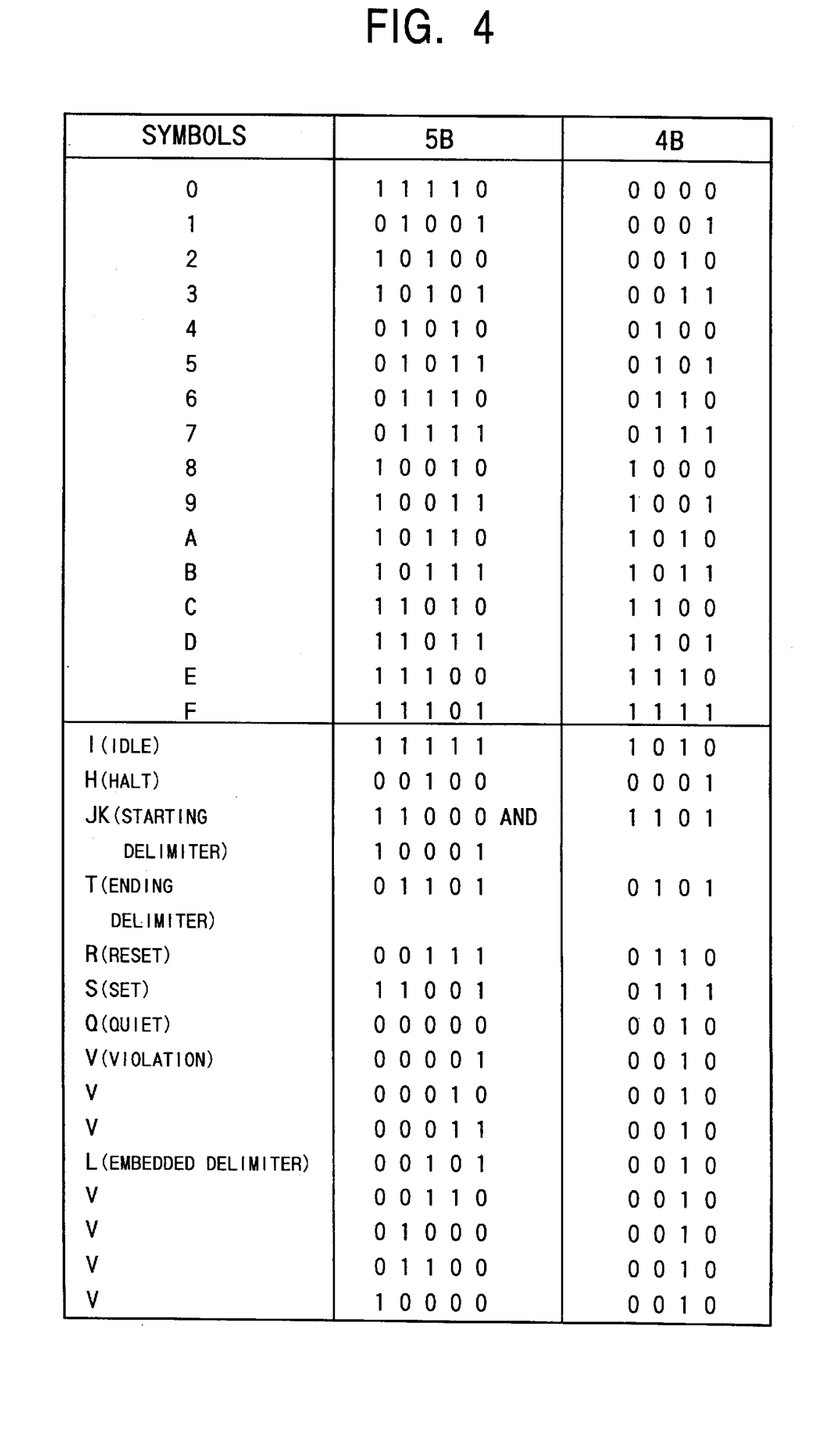
FIG. 4 is a chart showing examples of 4B/5B codes used in the present invention.

In addition, according to the 1394 communication using the optical-fiber cable, of the present invention, the UTP cable or the STP cable, the data rates are transmitted based on the number of times certain control symbols are sent. FIG. 4 shows a table of symbols used in the present invention. In the 1394 communication using the optical-fiber cable, the UTP cable or the STP cable, data of the 1394 communication is transmitted by 4B/5B codes. The 4B/5B codes are a coding method standard used in digital data communication, and are also used in 100-Mbps Ethernet, FDDI and so forth. Each symbol employed as a code has a different use depending on the communication method using the symbol. In any evebt, aside from the 4B/5B coding methid, there are other types of coding methods, which will be described below.

The 4B/5B codes have sixteen types of control symbols. The symbol "JK" is transmitted to the prefix area of a 1394 packet, and for example, the symbol "S" is used for notification of the data rate. At this time the data rate is transmitted based on the number of times that the symbol "S" is inserted (sent) in the prefix area of the 1394 packet. For instance, as shown in FIG. 3, no insertion of the symbol "S" means S100, the insertion of one "S" means S200, and the insertion of two "S"s means S400. Even if a faster data rate is added to the 1394 standard in the future, this method is capable of coping with such a case by increasing the number of times the symbol "S" is inserted. Instead of the recognition with the number of times for sending the symbol "S", the case of sending another predetermined symbol, e.g., the symbol "R" may be recognized as S400.

Although the number of the symbols "JK" in the prefix region differs depending on each data rate, it is preferable to insert the symbol "S" used for notification of the data rate in the first half as long as circumstances permit. This is because it is preferable that data-rate information be recognized as early as possible. The symbol "JK" must be initially sent. The reason is that symbol synchronization needs to be performed as described above.

The foregoing has described the 4B/5B codes by way of example. However, coding methods such as RMI (restricted mark inversion), CMI, AMI, mB/1C, mB/nB, 4B/3T, and 2B1Q codes, to which the present invention can be applied, are realized by similarly assigning the 1394 control signals to the control codes of each coding method. For example, according to an example of 8B/10B coding, a symbol "Data-Prefix" is used as a control symbol (corresponding to the "JK"), and a symbol "Speed" is used as a transmission-rate communication symbol (corresponding to the "S"). The use of these is similar to that of the "JK" and the "S".

Figure 5A:
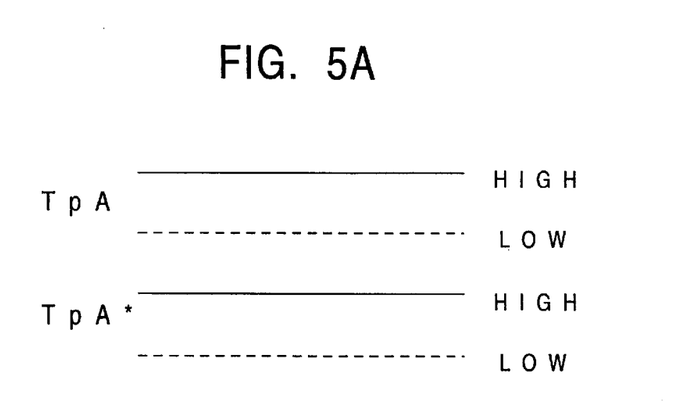
FIGS. 5A and 5B are diagrams showing a method for realizing a Tp bias when a 1394 cable is used and an example of a method for realizing a Tp bias according to the present invention, respectively.
Figure 5B:
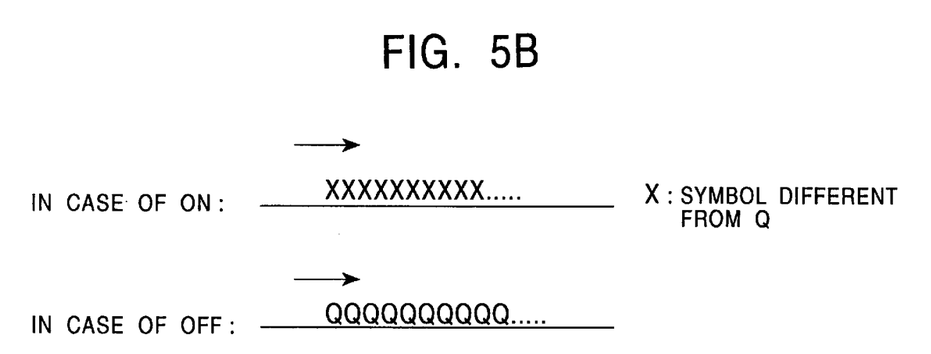

In addition, as shown in FIG. 5A, there is the Tp bias signal in the 1394 communication, which is used to detect with a cable one node being connected to another node. In other words, by fixing TpA and TpA* as bias signals in a data-flow cable at high levels, the Tp bias is switched on. Also, as shown in FIG. 5B, in the optical-fiber, UTP or STP cable, by continuously sending a control symbol different from "Q", the Tp bias is switched on. When the symbol "Q" comes, the Tp bias is determined to be off. The "Q" represents a condition without a signal. For example, also a condition with a connector removed is equivalent to the condition "Q".

Even when the Tp bias is off, maintaining connection to another node requires synchronization. In this case continuation of the symbol "Q" for a long period is disadvantageous in synchronization. Accordingly, the use of a control symbol with large signal change, e.g., "1" obtains an advantage of maintaining PLL stability. The phrase "large signal change" has the following meaning.

An MLT-3 circuit 16 and an NRZI coding circuit 20 (described below) change their output levels whenever bit "1" is input thereto. Since the symbol "I" is apparently "11111" as shown in FIG. 4, the level changes with respect to a total of five bits. Accordingly, such a condition is described as large signal change. Therefore, as described below, in the case of the optical fiber which is not affected by unnecessary radiation, the symbol "I" may be used. The symbol "I" is data which is sent when there is no data, and is used to mainly maintain synchronization. In reverse, when a cable which is easily affected by unnecessary radiation, such as the UTP or STP cable, a control symbol with small signal change is needed.

In particular, in the case of the UTP or STP cable it is necessary that the unnecessary radiation be weakened when a control symbol with strong signal change, e.g., "1" is sent. Instead, when the symbol "1" needs to be sent, a control symbol with small signal change, e.g., "H" is sent for a response. The STP cable is less affected by the unnecessary radiation than the UTP cable since it is processed for shielding. However, it is preferable to use the symbol "H". As shown above, the control symbols "Q", "I" and "H" have respective characteristics, so it is ideal that they should be used to correspond to the type of cable. Nevertheless, when it is requested that control symbols common in any type of cable be used, proper selection is performed considering the characteristics and defects of each type of cable.

Concerning a physical-layer-control large-scale integration (LSI) according to the present invention, three examples adapted for the UTP or STP cable, for the POF (plastic optical fiber) cable and for both of these types will be described below.

Figure 6:
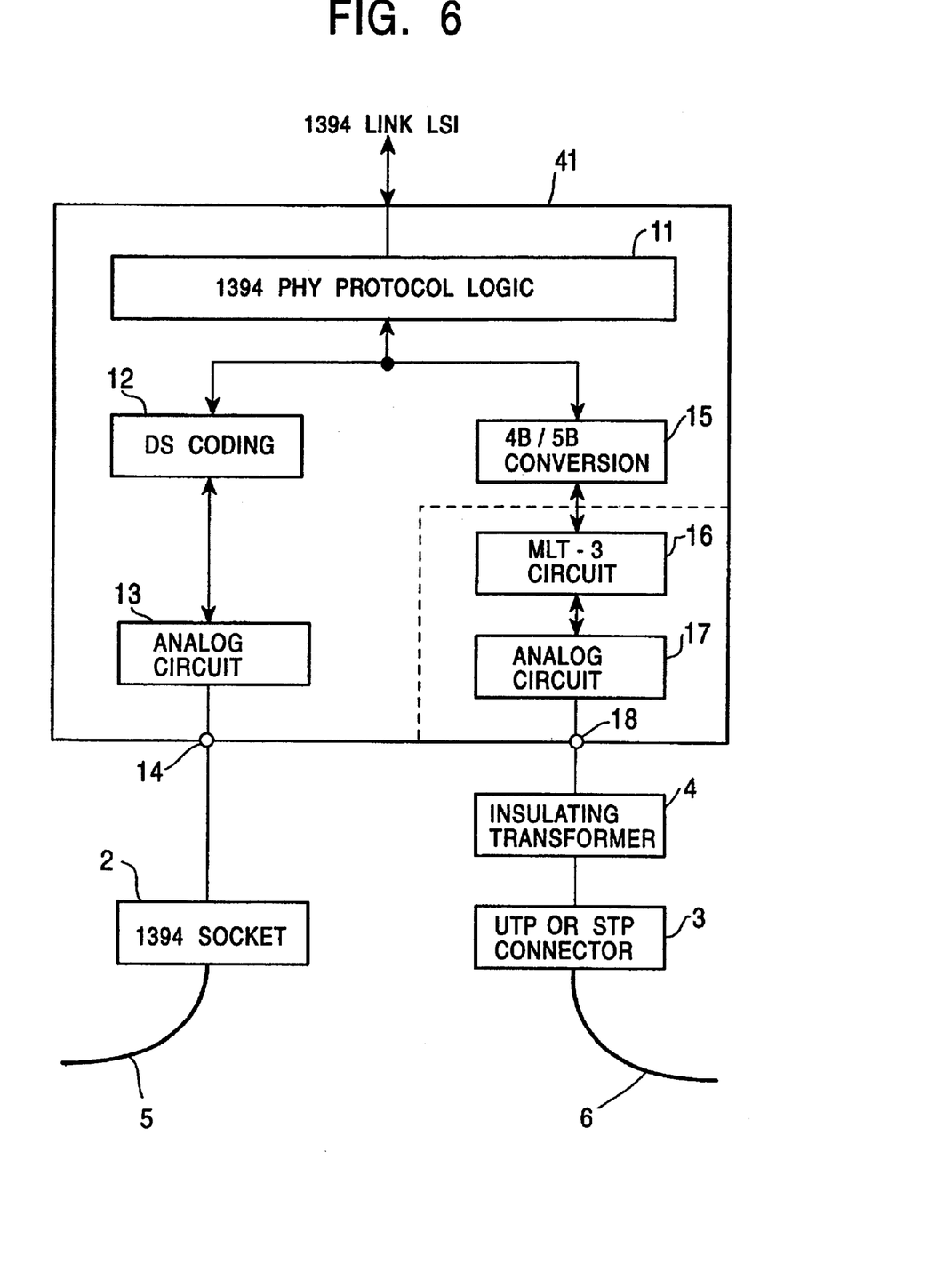
FIG. 6 is a block diagram showing a physical-layer control LSI according to an embodiment of the present invention.

A physical-layer control LSI 41 shown in FIG. 6 is adapted for the UTP or STP cable. The physical-layer control LSI 41 is provided with a port 14 to which a socket 2 of a 1394 cable 5 is connected, and a port 18 to which a connector 3 of a UTP or STP cable (hereinafter referred to as "UTP/STP cable") is connected. The physical-layer control LSI 41 includes circuits for performing the 1394 standard process, and circuits for performing a process for the above-described UTP or STP transmission, which correspond to the two ports 14 and 18.

In the physical-layer control LSI 41 there is provided a 1394 physical-layer protocol logic 11. The 1394 physical-layer protocol logic 11 executes bus initializing, arbitration, and the various processes described with reference to FIGS. 1A–1D to FIGS. 5A and 5B.

A DS coding circuit 12 for performing the DS coding of sending data and the DS coding of received data is connected to the 1394 physical-layer protocol logic 11, and an analog circuit 13 for performing the level adjustment of the sending or received signal and so forth is connected to the DS coding circuit 12. The two circuits are ones for performing the 1394 standard process. The analog circuit 13 is connected to the port 14, and the 1394 socket 2 is connected to the port 14.

A 4B/5B conversion circuit 15 for performing the 4B/5B conversion of the sending data and the 5B/4B conversion of the received data is also connected to the 1394 physical-layer protocol logic 11. An MLT-3 circuit 16 for performing the MLT (multilevel transmission)-3 coding of the sending data and the MLT-3 reverse conversion of the received data is connected to the 4B/5B conversion circuit 15, and an analog circuit 17 for performing the adjustment of sending/received-signal level and so forth is connected thereto. The analog circuit 17 is connected to the port 18, and the UTP/STP connector 3 is connected to the port 18 via an insulating transformer 4. The MLT-3 circuit 16 performs voltage-level conversion based on three-valued logic, and gives a level change when bit "1" is input. The physical-layer control LSI 41 may consist of a single integrated circuit. However, a portion shown by a dotted line in FIG. 6 may consist of another integrated circuit. Practically, it is possible to build the insulating transformer 4 into the UTP/STP connector 3.

Figure 7:
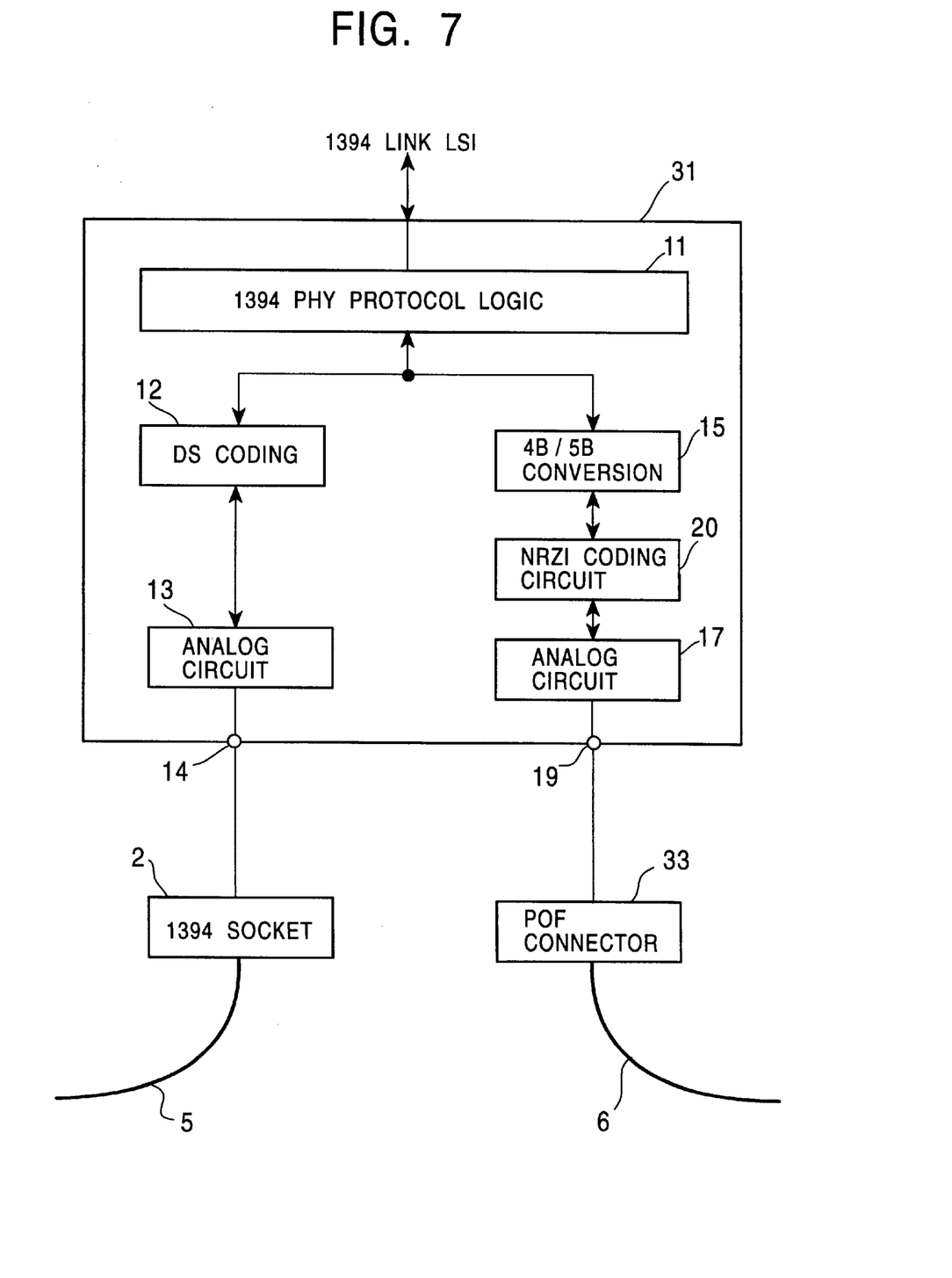
FIG. 7 is a block diagram showing a physical-layer control LSI according to another embodiment of the present invention.

A physical-layer control LSI 31 shown in FIG. 7 is adapted for the POF cable. The physical-layer control LSI 31 is provided with a port 14 to which a socket 2 of a 1394 cable 5 is connected, and a port 19 to which a connector 33 (hereinafter referred to as a "POF connector") of a POF cable 7 is connected. The connector 33 also has an optical linking function, and specifically has optical/electronic and electronic/optical converters for conversion between optical information and electrical information. The physical-layer control LSI 31 includes circuits for performing the 1394 standard process, and circuits for performing a process for the above-described POF-cable transmission, which correspond to the two ports 14 and 19. In order to perform the POF-cable transmission, an NRZI (non-return to zero inverted on ones) coding circuit 20 is used instead of the MLT-3 circuit 16. The NRZI coding circuit 20 is a two-valued logical circuit in which input of bit "1" performs inversion.

Figure 8:
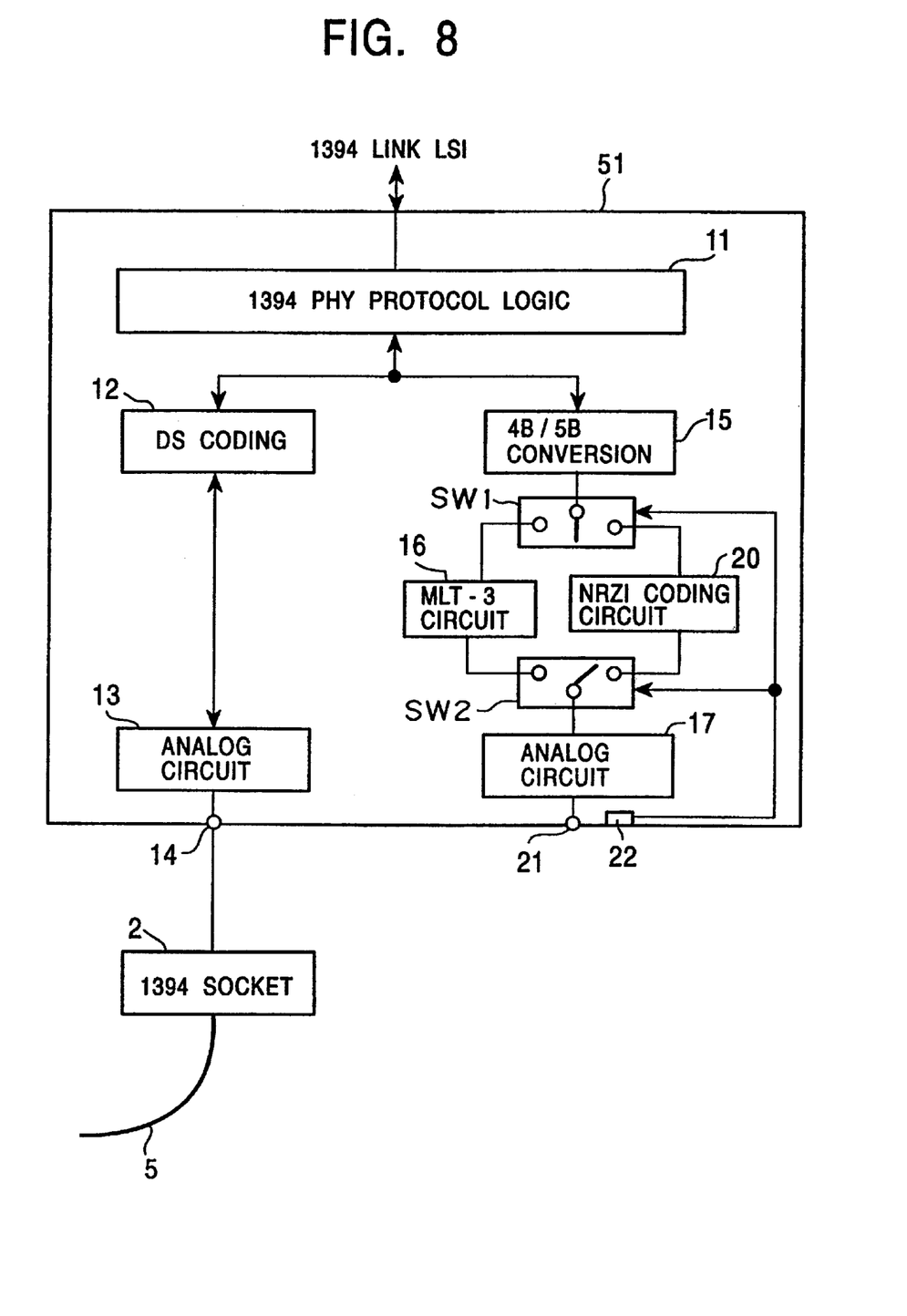
FIG. 8 is a block diagram showing a physical-layer control LSI according to a further embodiment of the present invention.

A physical-layer control LSI 51 shown in FIG. 8 is adapted for the UTP or STP cable, and the POF cable. The physical-layer control LSI 51 is provided with a port 14 to which a socket 2 of a 1394 cable is connected, and a port 21 to which both the UTP or STP cable and the POF cable are connected. The physical-layer control LSI 51 includes an MLT-3 circuit 16 used for connection to the UTP or STP cable, and an NRZI coding circuit 20 used for connection to the POF cable, and further includes a connector detector 22 for connecting the type of connector connected to the port 21, and first and second switches SW1 and SW2 which are controlled by the output of the connector detector 22. When the UTP or STP cable is connected to the port 21, both the first and second switches SW1 and SW2 are switched to the MLT-3 circuit 16. When the POF cable is connected to the port 21, both the first and second switches SW1 and SW2 are switched to the NRZI coding circuit 20.

The physical-layer control LSIs 41, 31 and 51 according to the present invention have the foregoing structures. Thus, when the 1394 socket 2 is connected to the port 14, the ON condition of the bias signal is transmitted by fixing TpA and TpA* at the high level as shown in FIG. 5A, and the data rate is transmitted based on the levels of TpB and TpB* as shown in FIGS. 2A to 2C.

In addition, when the UTP/STP connector 3 is connected to the port 18, when the POF connector 33 is connected to the port 19, and when the UTP/STP connector 3 or the POF connector 33 is connected to the port 21, the ON condition of the bias signal is transmitted by sending the symbol different from the symbol "Q" as shown in FIG. 5B, and the data rate is transmitted based on the number of the symbols "S" to be sent in the prefix area of the 1394 packet as shown in FIG. 3.

Practically, there are a data line and a strobe line between the 1394 physical-layer protocol logic 11 and the DS coding circuit 12, and there are a data line and a control line between the 1394 physical-layer protocol logic 11 and the 4B/5B conversion circuit 15. The above-described JK, S, R and so forth are sent by the control line, using the Prefix region shown in FIG. 3, and the Q, I, H and so forth are sent by the control line, using the idle region shown in FIG. 3. The data is sent by the data line as shown in FIGS. 1A to 1D, using the Data region shown in FIG. 3. Symbol "0" is sent as the "symbol (bit) being not used" shown in FIGS. 1A to 1D. The "symbol (bit) being not used" means that the symbol (bit) is not used in data transfer, in other words, it is not used as data to be transferred in the data region of the packet shown in FIG. 3. However, for other different uses, for example, the symbol (bit) can be used to send the control data.

Normally, in the IEEE 1394 the data-transmission rate, which changes momentarily, is dynamically changed using the JK and S. Accordingly, a time for sending symbols differs in accordance with each data rate. In addition, when sending or reception using the multi-purpose cable is performed, only blank portions are input under the influence of the rate as shown in FIGS. 1A to 1D. Therefore, a bit arrangement adapted for the maximum rate needs to be considered.

What is claimed is:

1. A data communication method comprising the steps of:
   connecting a plurality of electronic devices provided with a communication interface based on the IEEE 1394 standard by at least one type of cable selected from the group consisting of an optical-fiber cable, an unshielded-twisted pair (UTP) cable and a stand-alone cable comprising only one shielded-twisted pair (STP) cable;
   communicating data via said electronic devices; and
   transmitting data rates by sending at least one type of predetermined speed-control symbol via a data stream, wherein said data rates are transmitted based on the number of times said at least one type of predetermined speed-control symbol is inserted into said data stream.

2. A data communication method according to claim 1, further comprising allocating periodic bit regions which are not used at a low data rate to transfer data in a data packet to be transmitted, on a data stream by transmitting data bits at said low data rate only in predetermined portions of periodic intervals of said data stream, so as to facilitate a change in data communication to communication at higher data rates defined by the IEEE 1394 standard.

3. A data communication method according to claim 1, wherein a bias effect, defined in the IEEE 1394 standard, is supplied to said at least one type of cable by sending predefined control symbols.

4. A data communication method according to claim 3, wherein the predefined control symbols exhibit small signal change in order to limit unnecessary radiation in said UTP or said STP cables.

5. A data communication method according to claim 1, wherein said multi-purpose cable is an optical-fiber cable.

6. A data communication method according to claim 1, wherein said multi-purpose cable is an unshielded twisted pair (UTP) cable.

7. A data communication method according to claim 1, wherein said multi-purpose cable is a stand-alone cable comprising only one shielded twisted pair (STP) cable.

8. A data communication method in a data communication system with a variable data rate and having an interface to perform data communication among a plurality of electronic apparatuses, wherein a cable defined in said data-communication system is normally used in said data communication system, said method comprising the steps of:
   communicating data using an arrangement of bits corresponding to a maximum data rate, when a communication channel for performing data communication among said plurality of electronic apparatuses using a multi-purpose cable different from said cable defined in said data-communication system is used;
   allocating on a data stream periodic bit regions not used to transfer data in a data packet when said multi-purpose cable is used to perform the data communication at a low data rate, by transmitting data bits at said low data rate only in predetermined portions of periodic intervals of said data stream, so as to facilitate a change in data communication to higher data rate communication; and
   transmitting data rates based on the number of times one or more types of predetermined speed-control symbols is inserted into said data stream.

9. A data communication method according to claim 8, further comprising the step of supplying a bias effect, defined in said data-communication system, to said cable by sending a predefined control symbol.

10. A data communication method according to claim 9, further comprising the step of sending, when said predefined control symbol has a relatively strong signal change, a control symbol with small signal change to weaken unnecessary radiation.

* * * * *